J. SMOLARSKI.
VESSEL LID.
APPLICATION FILED JAN. 28, 1919.
1,308,533.
Patented July 1, 1919.
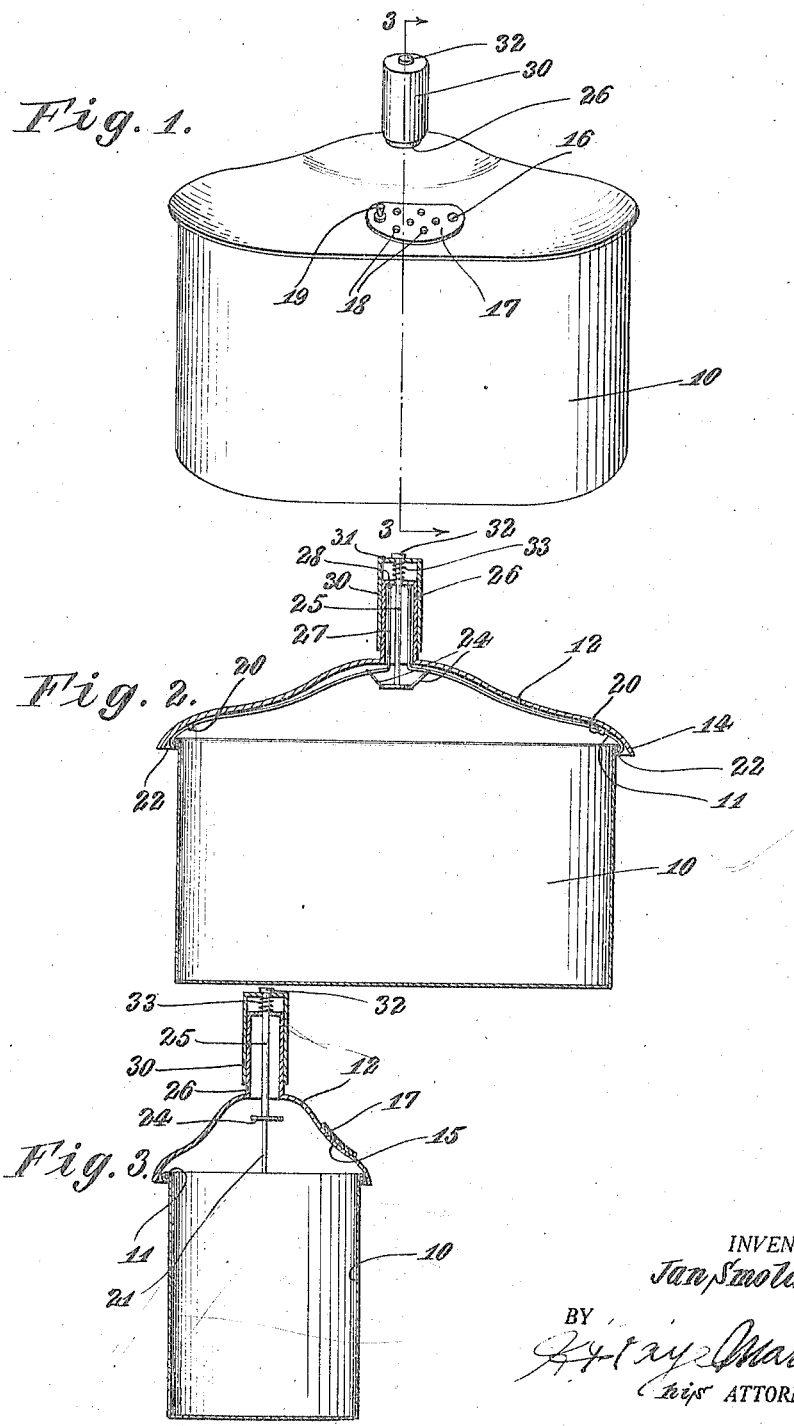
INVENTOR.
Jan Smolarski.
BY
his ATTORNEY.

UNITED STATES PATENT OFFICE.

JAN SMOLARSKI, OF OMAHA, NEBRASKA.

VESSEL-LID.

1,308,533.        Specification of Letters Patent.        Patented July 1, 1919.

Application filed January 28, 1919. Serial No. 273,584.

*To all whom it may concern:*

Be it known that I, JAN SMOLARSKI, a citizen of Austria, residing at Omaha, county of Douglas, and State of Nebraska, have invented certain new and useful Improvements in Vessel-Lids, of which the following is a specification.

This invention relates to improvements in domestic boilers, such as may be used for laundry purposes or for cooking, and has as its special object the provision of means whereby the lid or cover may be secured or disengaged from the edges of the vessel in an easy and effective manner.

A further object is to provide a lid having a plurality of perforations, and a shutter whereby said perforations may be opened and closed, either partially or wholly at will.

These and other like objects are attained by the novel construction and combination of parts hereinafter described and shown in the accompanying drawings, forming a material part of this disclosure, and in which—

Figure 1 is a perspective view showing a conventional type of boiler and indicating the application of the invention.

Fig. 2 is a vertical sectional view taken through the center of the same, and

Fig. 3 is a similar vertical sectional view taken on line 3—3 of Fig. 1.

Throughout the several drawings the numeral 10 indicates a boiler or vessel, here shown of conventional type used in boiling articles in the process of laundrying, comprising vertical parallel side walls, an imperforate bottom and rounded ends the upper edges of the boiler walls having an outturned beading 11 as usual.

Adapted to fit closely over the level top of the boiler is a domed lid or cover 12, having extending marginal edges 14 and containing a plurality of openings 15 over which is pivoted, on a pin 16, a cover plate 17 the same having a plurality of perforations 18, alinable with the openings 15, the cover plate 17, being provided with an extending knob 19 by which it may be actuated.

Extending downward, near the ends of the cover 12, are lugs 20, close to the ends and slidably engaged therein are relatively flexible bent rods 21 terminating at their outer ends in hooks 22 adapted to engage with the exterior of the beading 11.

The inner ends of the bent rods, which conform closely to the interior of the cover 12, are joined together by a yoke 24, from which rises a central rod 25, the same passing upward through a covered cylindrical element 26 which is secured to the cover 12, and in which are the ends 27 of the bent rods 22.

These ends terminate against the cover 28 of the cylindrical element 26, over which is disposed a casing 30 from which the rod 25 extends, the rod being provided with an enlarged head 32 so that as the outer casing 30 is raised, the rod is raised with it, compressing the spring 33 and obviously when the outer casing 30 is depressed the rods 21 will be elongated so as to release the hooks 22 from contact with the beading 11, thus permitting the cover to be raised in the usual manner.

From the foregoing it will be seen that a device has been presented that will effectually hold the cover in engagement with the vessel until such time as it is desired to remove the same, which is accomplished by pressing upon the sliding casing 30, releasing the engaging hooks 32 and permitting the cover to be raised by contact with its edge in an obvious manner.

Having thus described my invention what I claim as new and desire to secure by Letters Patent is—

In a vessel lid, the combination with a vessel having a beaded upper edge, and a cover adapted to rest thereupon, of a cylindrical extension rising from the center of said cover, a rod slidably engaged therein, a pair of oppositely disposed bent bars conforming to the interior contour of said cover, springs engaged with said bars, hooks formed with said bars, said hooks being engageable below said beading, a casing slidably engaged with said cylindrical extension, a spring between said beading and said extension whereby said bars are normally held in a raised position, and means permitting said casing to be depressed, thereby lengthening said bars and releasing said hooks.

In testimony whereof, I have signed my name to this specification in the presence of two subscribing witnesses, this 11 day of January 1919.

JAN SMOLARSKI.

Witnesses:
PERCY E. GWYNNE,
J. H. KOPIETZ.